(12) United States Patent
Gatter et al.

(10) Patent No.: US 10,362,913 B2
(45) Date of Patent: Jul. 30, 2019

(54) CLEANING APPARATUS DATA MANAGEMENT SYSTEM AND METHOD

(71) Applicant: Diversey, Inc., Sturtevant, WI (US)

(72) Inventors: Heinz Gatter, Vienna (AT); Patrick Hanhart, Wängi (CH)

(73) Assignee: Diversey, Inc., Fort Mill, SC (US)

( * ) Notice: Subject to any disclaimer, the term of this patent is extended or adjusted under 35 U.S.C. 154(b) by 347 days.

(21) Appl. No.: 15/207,200

(22) Filed: Jul. 11, 2016

(65) Prior Publication Data

US 2016/0316981 A1 Nov. 3, 2016

Related U.S. Application Data

(63) Continuation-in-part of application No. PCT/US2015/010879, filed on Jan. 9, 2015.

(Continued)

(51) Int. Cl.
*A47L 9/28* (2006.01)
*A47L 11/40* (2006.01)
(Continued)

(52) U.S. Cl.
CPC ............... *A47L 9/2805* (2013.01); *A47L 5/28* (2013.01); *A47L 7/0004* (2013.01);
(Continued)

(58) Field of Classification Search
CPC ........ A47L 9/2805; A47L 5/28; A47L 7/0004; A47L 11/4011; A47L 11/4044;
(Continued)

(56) References Cited

U.S. PATENT DOCUMENTS

| | | | |
|---|---|---|---|
| 7,199,711 | B2 | 4/2007 | Field |
| 7,877,166 | B2 | 1/2011 | Harwig et al. |

(Continued)

FOREIGN PATENT DOCUMENTS

| | | |
|---|---|---|
| CN | 101581935 | 11/2009 |
| CN | 101960424 | 1/2011 |

(Continued)

OTHER PUBLICATIONS

First Office Action from the State Intellectual Property Office of China for Application No. 201580004300.X dated Mar. 29, 2018 (16 pages).

(Continued)

*Primary Examiner* — Shahed Ahmed
(74) *Attorney, Agent, or Firm* — Michael Best & Friedrich LLP (57) ABSTRACT

A mobile cleaning system, method, and machine is provided, wherein a chassis, a communications module configured to communicate with a device remote from the chassis, a sensor operable to sense one or more characteristics of the mobile cleaning machine, and a controller including a processor and memory are provided. The processor is programmed to perform instructions stored in the memory, and the instructions include receiving the one or more characteristics of the mobile cleaning machine, receiving a non-mobile cleaning machine data set from the remote device, and transmitting at least one of the one or more characteristics of the mobile cleaning machine and the non-mobile machine data to a central location.

20 Claims, 6 Drawing Sheets

Related U.S. Application Data (60) Provisional application No. 61/925,899, filed on Jan. 10, 2014.

(51) Int. Cl.
*A47L 5/28* (2006.01)
*A47L 7/00* (2006.01)
*G05B 19/042* (2006.01)

(52) U.S. Cl.
CPC ...... *A47L 11/4011* (2013.01); *G05B 19/0423* (2013.01); *G05B 2219/25022* (2013.01)

(58) Field of Classification Search
CPC ............. A47L 11/4055; A47L 11/4088; A47L 11/4083; A47L 7/0023; G05B 19/0423; G05B 2219/25022
See application file for complete search history.

(56) References Cited

U.S. PATENT DOCUMENTS

| | | |
|---|---|---|
| 8,002,181 B2 | 8/2011 | Ulrich et al. |
| 8,018,329 B2 | 9/2011 | Morgan et al. |
| 8,060,400 B2 | 11/2011 | Wellman |
| 8,428,778 B2 | 4/2013 | Landry et al. |
| 8,595,892 B1 | 12/2013 | Everette, Jr. |
| 8,774,970 B2 | 7/2014 | Knopow et al. |
| 8,781,626 B2 | 7/2014 | Landry et al. |
| 2002/0152576 A1 | 10/2002 | Murray et al. |
| 2005/0171636 A1 | 8/2005 | Tani |
| 2006/0103523 A1 | 5/2006 | Field |
| 2006/0293794 A1* | 12/2006 | Harwig ................ G05D 1/0261 700/253 |
| 2009/0101712 A1 | 4/2009 | Ulrich et al. |
| 2009/0281661 A1* | 11/2009 | Dooley ................ A47L 11/4036 700/258 |
| 2011/0004342 A1* | 1/2011 | Knopow ................... A47L 5/28 700/253 |
| 2013/0015962 A1 | 1/2013 | Dailey |
| 2013/0211589 A1 | 8/2013 | Landry et al. |
| 2014/0188325 A1* | 7/2014 | Johnson ............... G05D 1/0227 701/26 |

FOREIGN PATENT DOCUMENTS

| | | |
|---|---|---|
| DE | 10-2010-042347 | 4/2012 |
| EP | 2330471 | 6/2011 |
| JP | 2002342544 A | 11/2002 |
| WO | 2012/157951 | 11/2012 |

OTHER PUBLICATIONS

EP15735580.1 Extended European Search Report dated Sep. 13, 2017 (6 pages).

International Search Report and Written Opinion, PCT/US2015/010879, dated May 6, 2015.

International Search Report and Written Opinion, PCT/US2015/010882, dated May 1, 2015.

Japanese Patent Office Examination Report for Application No. 2016-545880 dated Oct. 16, 2018 (5 pages, English translation included).

* cited by examiner

CLEANING APPARATUS DATA MANAGEMENT SYSTEM AND METHOD

TECHNICAL FIELD

The present invention relates to data management systems and methods including, but not limited to, data management systems and methods for communicating data related to characteristics of equipment as well as non-equipment data.

BACKGROUND

Mobile cleaning machines such as floor cleaning machines are generally known in the art. Mobile cleaning machines can be commonly divided into two categories: Mobile cleaning machines in which the operator is standing and walking behind the machine ("walk-behind" machines), and mobile cleaning machines in which the operator is sitting, or standing, on the machine itself ("ride-on" machines).

SUMMARY

Equipment and employee data can be used to increase visibility into the operations of a business, including cleaning operations of the business. Increased visibility leads to reduction of costs and improved cleaning effectiveness. These results are increasingly important to many businesses (e.g., hospitals, clinics, food service establishments, and the like) where a high level of cleanliness is required. One way of achieving such cleanliness is to continually monitor data related to employees and equipment. Employee data may include, but is not limited to, employee start/stop time, task start/stop time, maintenance/quality issues, location of equipment, and operational time of equipment. Equipment data may include, but is not limited to, various sensed characteristics of a mobile cleaning machine.

In some embodiments, the present invention provides a mobile cleaning machine including a chassis and a communications module configured to communicate with a device remote from the chassis. The machine also includes a sensor operable to sense one or more characteristics of the cleaning machine, and a controller including a processor and memory. The processor is programmed to perform instructions stored in the memory. The instructions include receiving the one or more characteristics of the cleaning machine, receiving a non-machine data set from the remote device, and transmitting at least one of the one or more characteristics of the cleaning machine and the non-machine data set to a central location.

In another embodiment, the invention provides a method of communicating a characteristic of a mobile cleaning machine and a non-machine data set to a central location. The method includes sensing one or more characteristics of the cleaning machine, transmitting the sensed characteristics to a controller on the cleaning machine, transmitting non-cleaning machine data to the controller, and transmitting at least one of the sensed characteristics of the cleaning machine and the non-cleaning machine data to the central location via the controller.

In another embodiment, the invention provides a system for communicating one or more characteristics of a mobile cleaning machine and a non-machine data set to a central location. The system includes a machine-mounted gateway device, a communication device configured to communicate non-machine data to the gateway device, and a mobile cleaning machine. The cleaning machine has a chassis, a communications module configured to communicate with the communication device, a sensor operable to sense one or more characteristics of the cleaning machine, a processor, and a memory. The processor is programmed to perform instructions stored in the memory. The instructions include receiving the one or more characteristics of the cleaning machine, receiving the non-machine data, and transmitting at least one of the one or more characteristics of the cleaning machine and the non-machine data set to a central location via the gateway device.

Other aspects of the invention will become apparent by consideration of the detailed description and accompanying drawings.

BRIEF DESCRIPTION OF THE DRAWINGS

FIG. 4b is a schematic illustration of a controller for the scanner of FIG. 4a.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
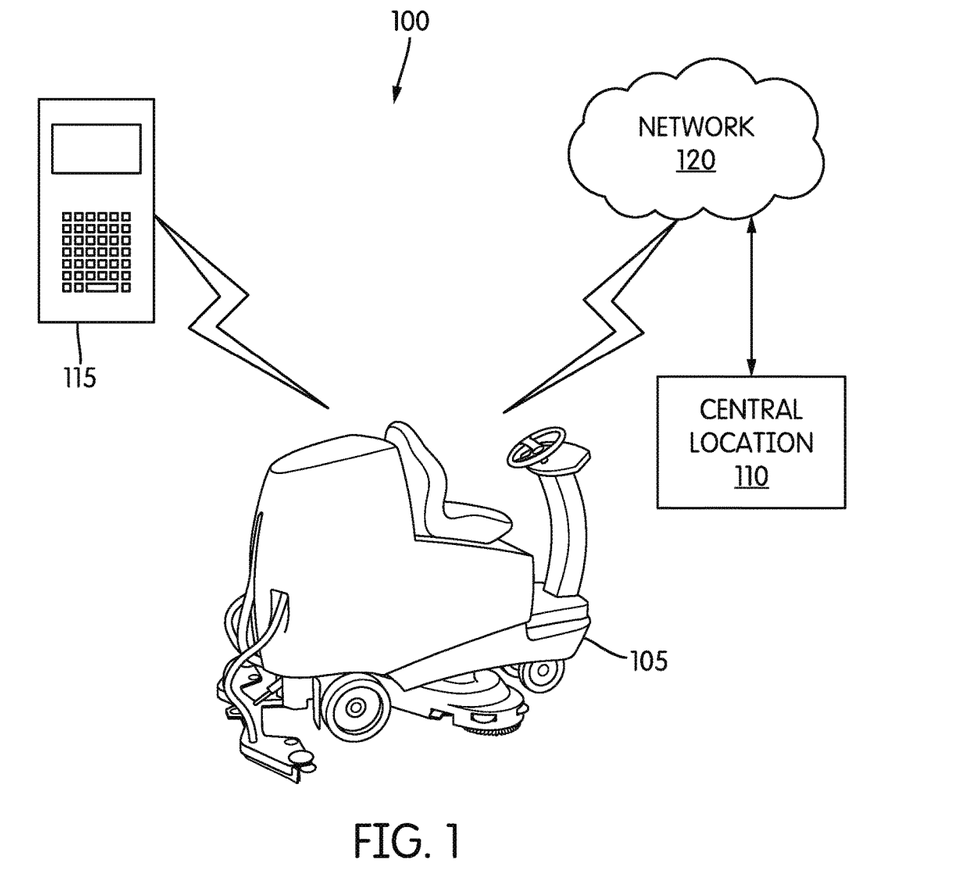
FIG. 1 is a diagram illustrating a data management system embodying the invention.

FIG. 1 illustrates a data management system 100. The data management system 100 includes a mobile apparatus 105 (e.g., an autoscrubber, generically referred to as a "cleaning machine" for purposes of description) that is in communication with a central location 110 and a mobile reader 115. The illustrated cleaning machine 105 receives non-machine data (e.g., from the mobile reader 115) and transmits the non-machine data, along with sensed characteristics of the cleaning machine 105, to the central location 110 via a network 120.

Figure 2:
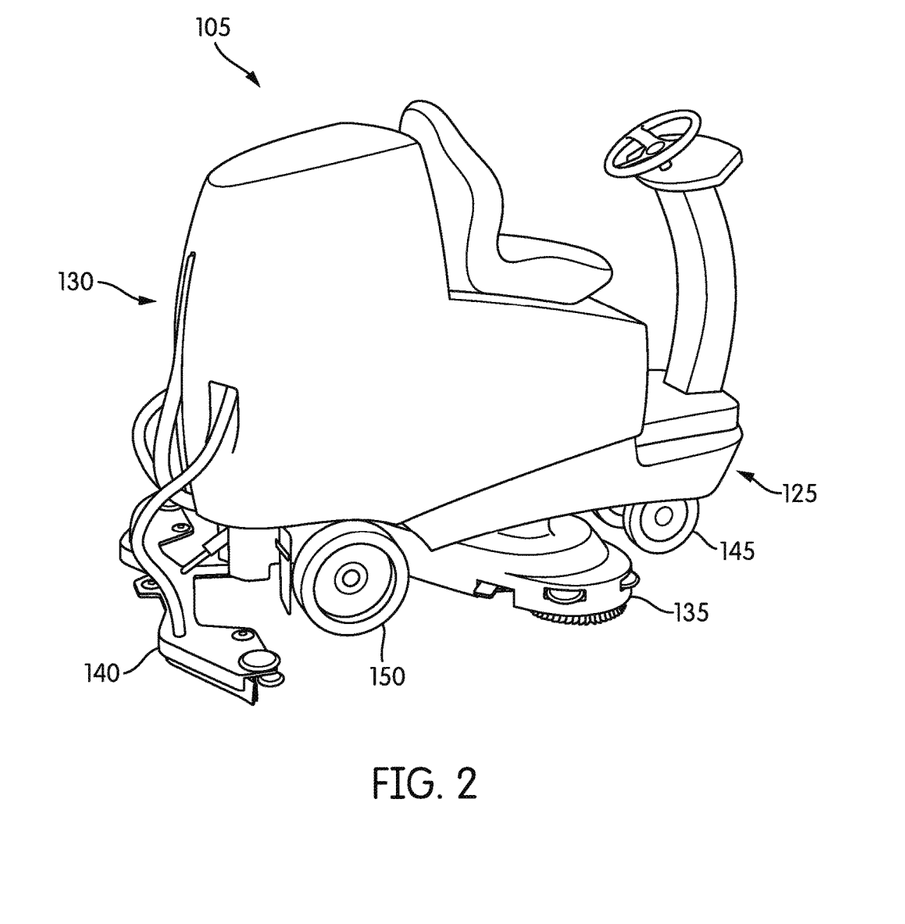
FIG. 2 is a perspective view of a cleaning machine used in conjunction with the data management system of FIG. 1.

FIGS. 1 and 2 illustrate an exemplary mobile cleaning machine 105 of the data management system 100. The cleaning machine 105 is configured to clean a surface such as a floor. As illustrated, the cleaning machine 105 is a "ride-on" floor cleaning machine, although the machine 105 can take the form of a "walk-behind" cleaning machine. The cleaning machine 105 is configured to clean a surface such as a floor and includes, among other things, a frame or chassis 125. The chassis 125 supports several components of the cleaning machine 105, including but not limited to a tank 130, a brush unit 135, and a suction device (e.g., a squeegee assembly) 140.

The tank 130 holds a liquid (e.g., cleaning solution including water and a cleaning agent) that is used by the cleaning machine 105 during operation. The brush unit 135 scrubs the surface to agitate dirt and other debris on the surface, and the suction device 140 controls and draws the liquid and debris up from the surface.

Figure 3:
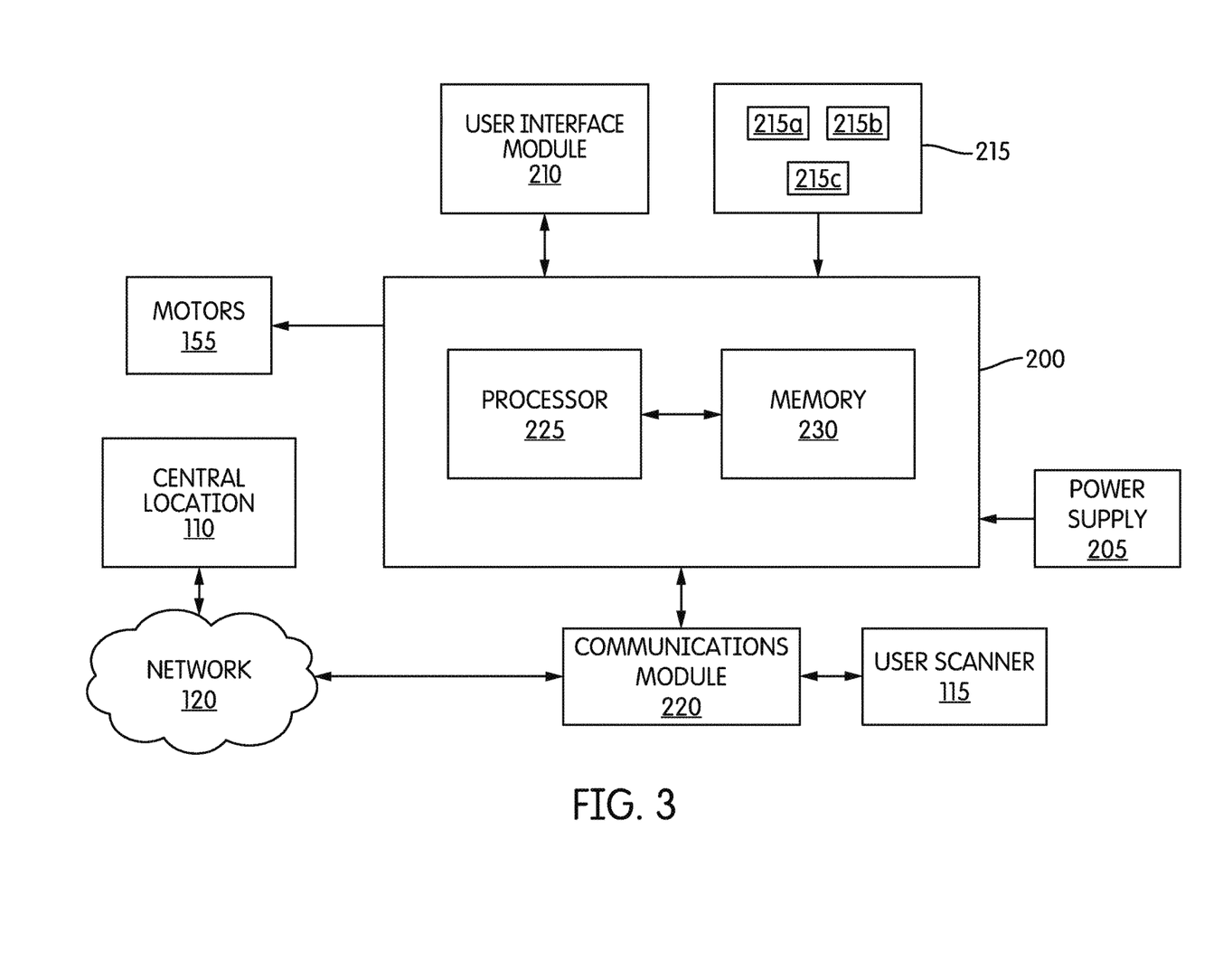
FIG. 3 is a block diagram of a control system of the cleaning machine of FIG. 2.

With reference to the exemplary cleaning machine 105 illustrated in FIG. 2, the chassis 125 is coupled to and supported by one or more front wheels 145 and one or more rear wheels 150. The illustrated cleaning machine 105 is directed or steered by the front wheels 145 and is driven by the rear wheels 150, although the machine 105 can be driven with any suitable combination of drive and driven wheels. With reference to FIGS. 2 and 3, the driven wheels 150 are powered by one or more motors 155 (FIG. 3). Although the cleaning machine 105 described and illustrated in the accompanying drawings includes the wheels 145, 150 for movement of the cleaning machine 105 over a surface, it will be appreciated that other types of devices can be used to move the cleaning machine 105. These other types of devices can include, for example, powered or un-powered tracks. For the sake of simplicity, the term "wheel" as used herein and in the appended claims refers to all such moving elements.

FIG. 3 illustrates a block diagram of a control system including a controller 200 associated with the cleaning machine 105 of FIG. 2. The illustrated controller 200 is electrically and/or communicatively connected to a variety of modules or components of the cleaning machine 105. For example, the illustrated controller 200 is connected to the motors 155, a power supply module 205, a user interface module 210, one or more sensors 215, and a communications module 220. Each of the motors 155, the power supply module 205, the user interface module 210, the sensors 215, and the communications module 220 is supported on and coupled to the machine 105.

The controller 200 includes combinations of hardware, and software and/or firmware that are operable to, among other things, control operation of the cleaning machine 105. The exemplary controller 200 includes a plurality of electrical and electronic components that provide power, operational control and, in some cases, protection to the components and modules within the controller 200 and/or cleaning machine 105. For example, the illustrated controller 200 includes a processing unit 225 (e.g., a microprocessor, a microcontroller, or another suitable programmable device) and a memory 230. The controller 200 also can include other components and can be implemented partially or entirely on a semiconductor (e.g., a field-programmable gate array ("FPGA")) chip, such as a chip developed through a register transfer level ("RTL") design process.

The memory 230 includes, in some embodiments, a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. In some embodiments, the processing unit 225 is connected to the memory 230 and executes software instructions that are capable of being stored in a RAM of the memory 230 (e.g., during execution), a ROM of the memory 230 (e.g., on a generally permanent basis), or another non-transitory computer readable medium such as another memory or a disc. Software included in the illustrated implementation of the cleaning machine 105 can be stored in the memory 230 of the controller 200. The software includes, for example, firmware, one or more applications, program data, filters, rules, one or more program modules, and other executable instructions. The illustrated controller 200 is configured to retrieve from memory and execute, among other things, instructions related to the control processes and methods described herein. In other constructions, the controller 200 includes additional, fewer, or different components.

The power supply module 205 supplies a nominal voltage to the controller 200 and other components or modules of the cleaning machine 105. More specifically, the illustrated power supply module 205 receives power from one or more batteries or battery packs (not shown) and outputs a nominal DC voltage to the controller 200 and the other components or modules of the cleaning machine 105. The power supply module 205 can receive power from other grid-independent power sources (e.g., a generator, a solar panel, etc.) in some cases, or an AC voltage from which the nominal voltage is output to the controller 200 and the other components or modules of the cleaning machine 105.

In some embodiments, the power supply module 205 receives power from the cleaning machine 105 when the machine 105 is in operation and supplies the nominal voltage to the components and modules of the cleaning machines 105. In these embodiments, one or more batteries or battery packs can be charged (e.g., using a high-speed charger) during operation of the cleaning machine 105. When the cleaning machine 105 is not in operation, the power supply module 205 does not supply the nominal voltage to the components and modules of the cleaning machine 105. Instead, the power supply module 205 receives power from the batteries or a battery pack and supplies the nominal voltage to the control system (and possibly other components and modules of the machine 105).

The illustrated user interface module 210 controls or monitors aspects of the cleaning machine 105. For example, the user interface module 210 can be operably coupled to the controller 200 to control operation of the cleaning machine 105, and can include a combination of digital and analog input and/or output devices required to achieve a desired level of control and monitoring for the cleaning machine 105. For example, the user interface module 210 can include a display (e.g., a primary display, a secondary display, etc.) and input devices (e.g., touch-screen displays, a plurality of knobs, dials, switches, buttons, etc.). More specifically, the display can be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or a reflective bistable cholesteric display (i.e., e-paper). The user interface module 210 also can be configured to display conditions or data associated with the cleaning machine 105 in real-time or substantially real-time. For example, the user interface module 210 can be configured to display one or more of the status of the cleaning machine 105, the position or other operational indicator of the brush unit 135, an operational indicator of suction element 140, a fluid level of the tank 130, the time of operation of the cleaning machine 105 (whether total machine time since manufacture of the machine, or an incremental time such as hourly, daily, weekly, or monthly usage), and other aspects of the machine 105.

The sensors 215 sense one or more characteristics of the cleaning machine 105 and can include, for example, accelerometers 215a, position sensors 215b, and/or fluid level sensors 215c. The accelerometers 215a can sense acceleration of the cleaning machine 105 in a variety of directions (e.g., an x-direction, a y-direction, etc.). The position sensors 215b can sense the position of the cleaning machine 105 or the position of one or more components of the cleaning machine 105. For example, the position sensors 215b can sense the position of the cleaning machine 105 relative to a fixed object (e.g., a wall). As another example, the position sensors 215 can sense the position of the brush unit 135 and/or the suction element 140. As yet another example, the fluid level sensors 215c can sense a measurement of fluid contained in the tank 130. The level sensors 220 can also or instead measure an angular position of the cleaning machine 105 relative to a vertical axis. Fewer or more sensors 215 can be provided on the machine 105 as desired. For example, the control system can include a rotational sensor to detect speed(s) of brushes of the brush unit 135, motion or distance sensors to detect the distance the cleaning machine 105 has traveled, one or more timers for detecting a length of time the cleaning machine 105 has been used and/or the length of time any particular component (e.g., brushes of the brush unit, squeegees of the suction device 140, or other elements that may require occasional maintenance or replacement), temperature sensors to detect the temperature of a motor or engine propelling the cleaning machine 105, fluid held or dispensed by the cleaning machine, brushes of the brush unit 135, pumps for moving fluid in the cleaning machine 105, and the like.

The communications module 220 is configured to connect to and communicate with the mobile reader 115 and the central location 110. In some embodiments, the cleaning machine 105 includes a first communications module for communicating with the mobile reader 115, and a second communications module for communicating with the central location 110. For sake of simplicity, the term "communications module" herein applies to one or more communications modules individually or collectively operable to communicate with both the mobile reader 115 and the central location 110.

The communications module 220 communicates with the central location 110 through the network 120. In some embodiments, the network 120 is, by way of example only, a wide area network ("WAN") (e.g., a global positioning system ("GPS"), a TCP/IP based network, a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.), although other network types are possible and contemplated herein. In certain embodiments, the network 120 is a GSM or other WAM which is operable to allow communication between the communications module 220 and the central location 110 during moments of low-quality connections, such as but not limited to when the cleaning machine 105 is near a window.

The network 120 can be a local area network ("LAN"), a neighborhood area network ("NAN"), a home area network ("HAN"), or personal area network ("PAN") employing any of a variety of communications protocols, such as Wi-Fi, Bluetooth, ZigBee, near field communication ("NFC"), etc., although other types of networks are possible and are contemplated herein. Communications through the network 120 by the communications module 220 or the controller 200 can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), and the like.

The connections between the illustrated communications module 220 and the network 120 are wireless to enable freedom of movement and operation of the mobile cleaning machine 105 without being physically tethered to a computer or other external processing device to facilitate such communications. Although such a modality of communications is preferred for at least this reason, it is contemplated that the connections between the communications module 220 and the network 120 can instead be a wired connection (e.g., a docking station for the communications module, a communications cable releasably connecting the communications module 220 and a computer or other external processing device, or other communications interface hardware), or a combination of wireless and wired connections. Similarly, the connections between the controller 200 and the network 120 or the network communications module 220 are wired connections, wireless connections, or a combination of wireless and wired connections in any of the forms just described. In some embodiments, the controller 200 or communications module 220 includes one or more communications ports (e.g., Ethernet, serial advanced technology attachment ("SATA"), universal serial bus ("USB"), integrated drive electronics ("IDE"), etc.) for transferring, receiving, or storing data.

The central location 110 can include a centrally located computer, a network of computers, or one or more centrally located servers. The central location 110 can be adapted to store, interpret, and communicate data from one or more cleaning machines 105, and can also interpret the data and communicate the interpreted data to a user.

The mobile reader 115 can take the form of any portable communications device adapted to both receive data from a user and communicate that data to the communications module. The mobile reader 115 can take the form of, for example, a user scanner (e.g., bar code reader) as shown in the illustrated embodiment, a mobile phone adapted to communicate with the communications module, a tablet, PDA, and the like. The mobile reader 115 receives data (e.g., from a user such as an employee) and communicates the data to the communications module 220. In some embodiments, the data is indicative of employee information (e.g., start/stop times of employees, start/stop times of employee tasks, flagging maintenance and/or cleaning quality issues identified by an employee, entry of request for additional service needed at a particular location in a facility, and the like). The data can also take other forms (e.g., room identification and other information, cleaning and/or maintenance task information, and the like).

Figure 4A:
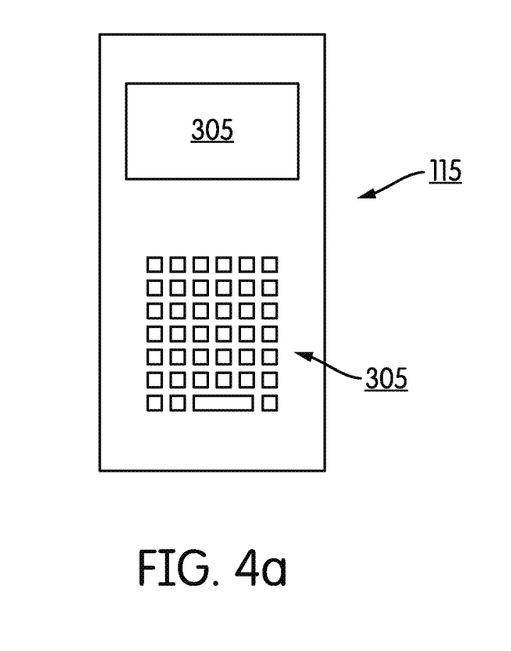
FIG. 4a is a schematic illustration of a scanner according to an embodiment of the invention.
Figure 4B:
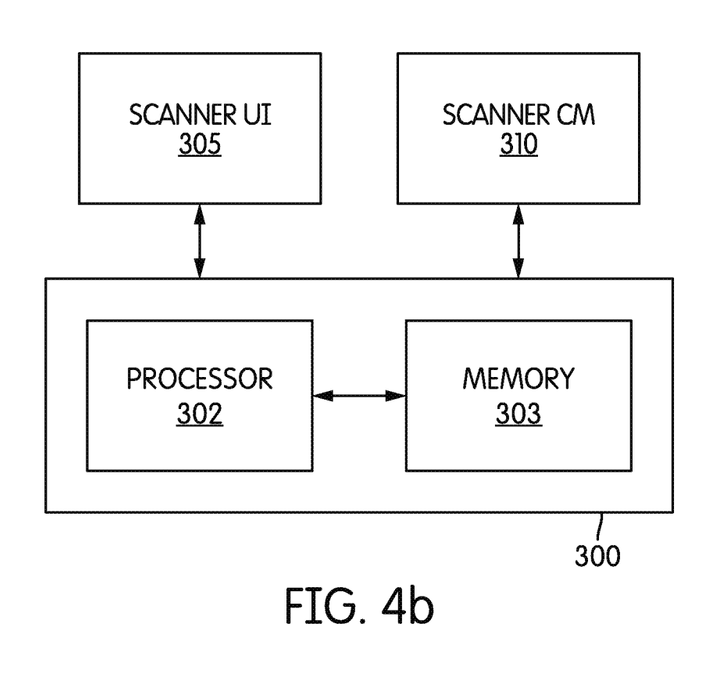

With continued reference to FIGS. 4a and 4b, the mobile reader 115 includes a reader controller 300, a reader user interface ("UP") 305, and a scanner communications module (CM) 310. In some embodiments, the reader controller 300 includes substantially similar components to the controller 200 of the cleaning machine 105. In other embodiments, the reader controller 300 includes more or fewer components than the controller 200 of the cleaning machine 105. As illustrated, the reader controller 300 includes a processor 302 and a memory 303.

The reader UI 305 can be substantially similar to the user interface module 210 of the cleaning machine 105. In the illustrated embodiment, the reader UI 305 receives and can transmit non-machine data relevant to cleaning and/or maintenance of a facility, which can be the same facility that is cleaned by the cleaning machine 105. In some embodiments, the reader UI can further display information indicative of the data as well as information concerning the functionality of the mobile reader 115. For example, a user can input employee information (e.g., start/stop time, start/stop time of an individual task, etc.) using the reader UI 305. Other data (e.g., any of the cleaning and/or maintenance information described above) can be entered directly by the user or scanned and input indirectly via the scan.

The scanner CM 310 connects and transmits data to the communications module 220 of the cleaning machine 105 (when the machine 105 is in operation or not in operation). For example, the scanner CM 310 communicates the inputted employee information to the communications module 220, and any of the cleaning and/or maintenance information described above. In some embodiments, the scanner CM 310 connects to the communications module 220 of the cleaning machine 105 wirelessly (e.g., IEEE 802.11g (WLAN), IEEE 802.15.1 (Bluetooth), NFC etc.). In other embodiments, the scanner communications module 220 connects to the communications module 220 of the cleaning machine 105 via a wired connection (e.g., a Universal Serial Bus (USB), an Ethernet cable, etc.). Although communications between the mobile reader 115 and the communications module 220 of the cleaning machine 105 are referenced herein in connection with a "scanner CM 310", it will be appreciated that the communications module of the mobile reader 115 need not necessarily include scanner hardware or functionality, and in alternative embodiments simply function to communicate information received by a user of the mobile reader 115 in any form (e.g., keypad, touch screen, voice command, and the like) to the communications module 220.

Figure 5:
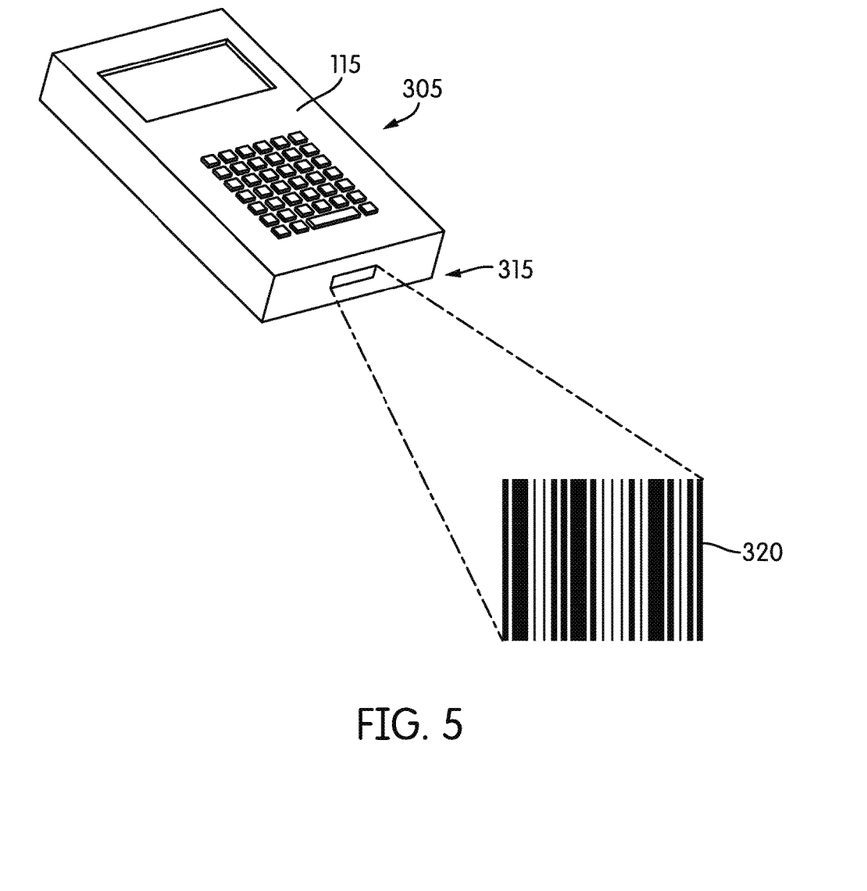
FIG. 5 is a schematic illustration of the scanner of FIG. 4a scanning a barcode.

FIG. 5 illustrates that the reader UI 305 includes a bar code reader 315 that can receive data from the user by reading one or more printed barcodes 320. The printed barcodes 320 correspond to data, such as but not limited to, various aspects of employee information and/or other non-cleaning machine related data. For example, upon starting a new task, the user may scan an appropriate barcode 320 corresponding to a particular type of non-cleaning machine related task to be performed by the user. Upon reading the barcode 320, the mobile reader 115 can record the start time of the task and the type of task, or other information stored in the barcode. After the user has finished the task, the user can re-scan the appropriate barcode 320 or another barcode to indicate completion of the task, a stop time of the task, or other information stored in the barcode. While the system 100 is described primarily with regard to barcodes 320, it should be appreciated that other information storage mechanisms (RFID tags, QR codes, etc.) can be used in combination with or in lieu of the barcodes 320.

In this manner, a user of the cleaning machine 105 can input data into the mobile reader 115 that does not relate directly to the cleaning machine 105 or operation of the cleaning machine 105 as the user performs other cleaning and/or maintenance tasks in a facility. That data (e.g., employee information such as start/stop times of employees, start/stop times of cleaning and/or maintenance tasks, indicators of maintenance and/or cleaning quality issues that need attention, requests for additional service needed at a particular location in a facility, room or facility location identifiers, cleaning and/or maintenance task information, and the like) can be easily input into the mobile reader 115 by the user, communicated from the mobile reader 115 to the communications module 220 of the cleaning machine 105, and thereafter conveniently communicated via the network 120 to the central location—whether along with cleaning machine information or otherwise. This process and functionality can streamline and provide significant efficiencies for cleaning and/or maintenance staff users in their daily tasks, and can provide the users or other individuals with more information (or more readily available information) regarding cleaning and maintenance operations of the facility.

In some embodiments, the mobile reader 115 can record employee start/stop time. Upon starting work, the user can scan a barcode 320 on their ID card or employee badge, or can otherwise input such information into the mobile reader 115. Upon reading the employee barcode 320, the mobile reader 115 records the start time of the employee. After the user has finished work, the user can re-scans the barcode 320 on their ID card or employee badge. Upon re-reading the employee barcode, the mobile reader 115 can record the stop time of the employee. The employee start/stop time can be transmitted from the mobile reader 115 to the communications module 220 and thereafter to the central location 110 via the network 120 as described above.

Throughout a work period, a user can input non-cleaning machine data (e.g., employee information, task information, other non-cleaning machine information) into the mobile reader 115 using the reader UI 305. The non-cleaning machine data can then be stored by the reader controller 300 (which can be configured to store a plurality of non-cleaning machine data at a time), and can be transmitted from the mobile reader 115 to the communications module 220 and thereafter to the central location 110 via the network 120 as described above.

The mobile reader 115 communicatively connects to the controller 200 via the scanner CM 310 and the communications module 220 upon being physically connected to or within wireless connection range of the system. When the connection is made, the scanner CM 310 communicates the non-cleaning machine data to the communications module 220. The non-cleaning machine data can then be stored in the memory 230 by the controller 200 in addition to being sent to the central location 110 via the network 120 (when the machine 105 is in operation or not in operation) as described above.

During a work period, the sensors 215 of the cleaning machine 105 detect several characteristics of the cleaning machine 105. The sensed characteristics are then transmitted to the controller 200 and can be stored in the memory 230. When the communications module 220 is physically or wirelessly connected to the central location 110 (e.g., through the network 120), the communications module 220 can communicate the non-cleaning machine data described above and the sensed characteristics (i.e. machine data) also described above to the central location 110. The central location 110 can then analyze and output the non-cleaning machine data and the machine data to an operator or other user.

There may be times when the communications module 220 cannot connect to the central location 110 (e.g., through the network 120), for example, when the cleaning machine 105 is located within a building and the network 120 is unavailable (e.g., due to connectivity issues, distance from a network node, etc.). In these situations, the communications module 220 can communicate the data when a connection can be acquired.

Figure 6:
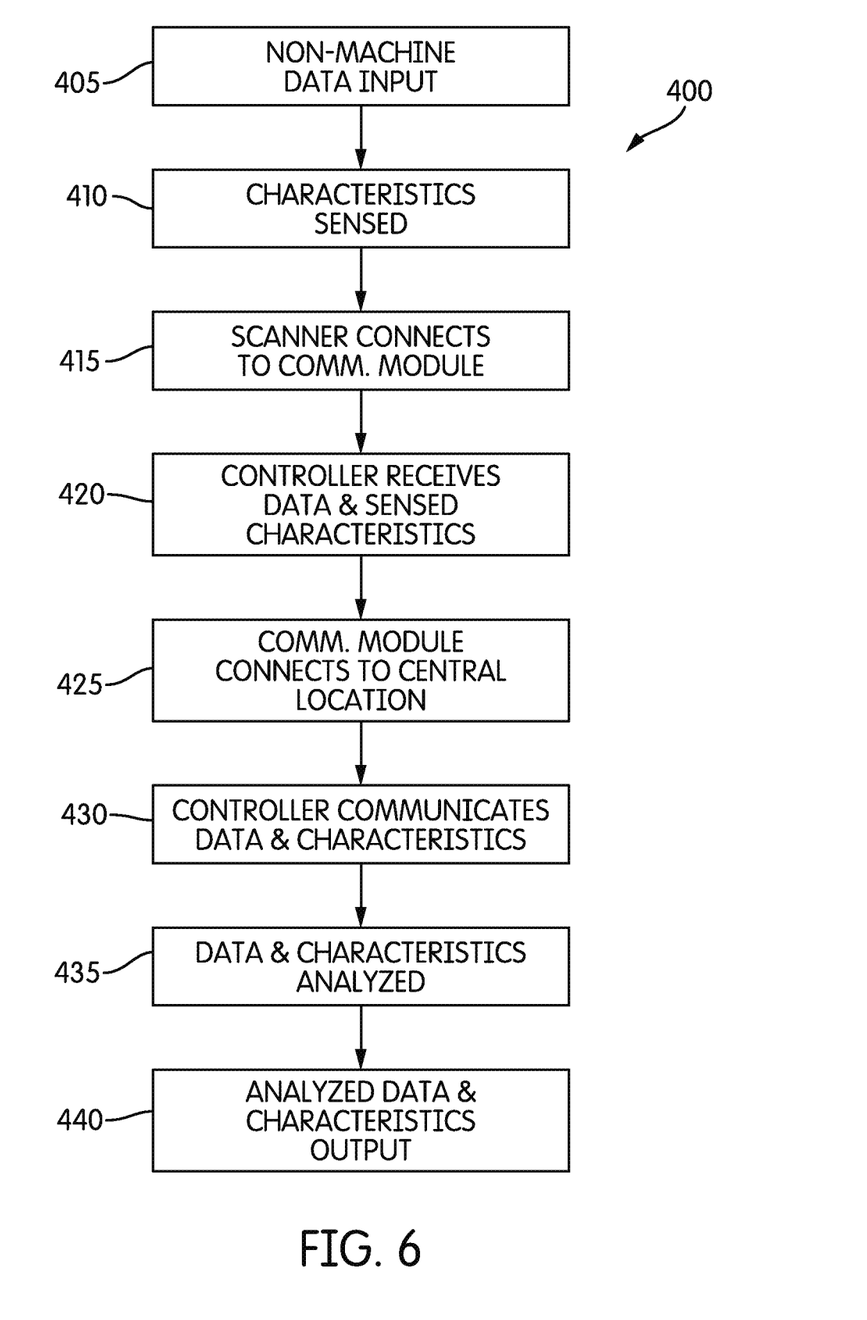
FIG. 6 is a flow chart illustrating exemplary operation of the data management system.

FIG. 6 is a flow chart illustrating exemplary operation 400 of the data management system 100. Although the operation 400 is illustrated as operating in a progressive or consecutive order, steps of operation 400 may operate simultaneously, or in an order other than what is illustrated and described.

With reference to FIG. 6, during a period of time (e.g., a work day), a user inputs non-cleaning machine data into the mobile reader 115 at Step 405 one or more times during the day. During this same period, the sensors 215 sense characteristics of the cleaning machine 105 at Step 410. At Step 415, the scanner CM 310 connects with the communications module 220 of the cleaning machine 105 after the reader 115 is within range or physically connected to the communications module 220. The controller 200 receives the non-cleaning machine data from the mobile reader 115 and the sensed characteristics from the sensors 215 at Step 420. Once within range or physically connected, the communications module 220 connects with the central location 110 through the network 120 at Step 425. The cleaning machine data and the non-cleaning machine data are transmitted to the central location 110 at Step 430. The central location 110 then interprets and analyzes the data at Step 435, and at Step 440, the central location 110 outputs the analyzed cleaning machine and non-cleaning machine data.

The controller 200 is positioned on the cleaning machine 105 and communicates cleaning machine and non-cleaning machine data between the cleaning machine 105 and a remote server (e.g., the central location 110) via the network 120. The controller 200 and the communications module 220 act in part as a data station or machine-mounted gateway device for the cleaning machine 105 and the mobile reader 115 for communicating cleaning machine data (e.g., operational parameters, location, etc.), as well as information that is unrelated to the cleaning machine to the central location 110. For example, the information can pertain to identification of an employee who may be using the cleaning machine 205 or the mobile reader 115; identification of areas being cleaned near the cleaning machine 105 and either by the cleaning machine 105 or by the user independent of the cleaning machine; maintenance issues (e.g., whether a light is out in a room where the cleaning machine 105 is located or near the cleaning machine 105, the need for a replacement part of the cleaning machine 105 or of nearby equipment observed, cleaned, or maintained by the user, and the like); additional cleaning solution or tools needed by the user to perform cleaning and/or maintenance tasks associated with the cleaning machine 105 or with the user's other (cleaning machine unrelated) cleaning and/or maintenance tasks; cleaning machine-related or cleaning machine unrelated quality assurance issues needing attention and identified by the user in the user's facility cleaning and/or maintenance tasks; and the like. The mobile reader 115 also can be used to scan a barcode or other information-carrying feature located on the cleaning machine 105, which establishes a wireless connection (e.g., Bluetooth, RFID, WiFi hotspots, etc.) to the communications module 220. With an established connection, data from the mobile reader 115 can be automatically communicated to the central location 120 through the communications module 220.

During operation of the machine 105, it is possible that the machine 105 may encounter a mechanical issue (e.g., a breakdown of one or more components) or other issues related to software or hardware installed on or part of the machine 105. In some embodiments, the machine 105 can include components (e.g., microphone, one or more speakers) on a control panel or other area of the machine 105 to facilitate wireless communication between a user of the machine 105 and a knowledge center (e.g., technical service, customer service, application service, etc.). Communication can be facilitated via a button or other device that can be operated or engaged to open a direct line of communication (e.g., via Bluetooth, mobile networks (e.g., 4G) via a SIM card, etc.) between the machine 105 and the knowledge center. By having this system, the user or customer can get direct help or support, minimizing down time of the machine.

Although the present invention is described and illustrated primarily in conjunction with a mobile cleaning machine (e.g., a scrubbing machine) and finds particular unique advantages and use in connection with a mobile cleaning machine, some aspects of the present invention may apply to any mobile apparatus, including but not limited to, a motor vehicle, a semi-truck trailer, construction equipment, an all-terrain vehicle, a watercraft, a mowing device (e.g., a lawn mower), and a dirt pickup device (e.g., a vacuum).

Various features and advantages of the present invention are set forth in the following claims.

The invention claimed is:
1. A mobile cleaning machine comprising:
   a chassis;
   a communications module configured to communicate with a device remote from the mobile cleaning machine;
   a sensor operable to sense one or more characteristics of the mobile cleaning machine; and
   a controller including a processor and memory, the processor programmed to perform instructions stored in the memory, the instructions including
      receiving the one or more characteristics of the mobile cleaning machine sensed by the sensor,
      receiving a non-mobile cleaning machine data set from the remote device, and
      transmitting, via the communications module, at least one of the one or more characteristics of the mobile cleaning machine and the non-mobile cleaning machine data set to a central location.
2. The cleaning machine of claim 1 further comprising a wireless receiver by which the non-mobile cleaning machine data set is received.
3. The cleaning machine of claim 1 wherein the mobile cleaning machine is a floor scrubbing machine.
4. The cleaning machine of claim 1 wherein the non-mobile cleaning machine data set includes at least one of employee information, non-mobile cleaning machine task information, and non-mobile cleaning machine maintenance information.
5. The cleaning machine of claim 1 wherein the non-mobile cleaning machine data set and the sensed characteristic are output to the central location via a network.
6. The cleaning machine of claim 1 wherein the one or more characteristics of the mobile cleaning machine include one or more of an x-direction, a y-direction, a mobile cleaning machine speed, a brush speed, a brush state, an acceleration, and a chemical deposition.
7. A method of communicating a characteristic of a mobile cleaning machine and a non-mobile cleaning machine data set to a central location, the method comprising:
   sensing one or more characteristics of the mobile cleaning machine;
   transmitting the sensed characteristics to a controller on the mobile cleaning machine;
   transmitting non-mobile cleaning machine data to the controller;

transmitting at least one of the sensed characteristics of the mobile cleaning machine and the non-mobile cleaning machine data to the central location via the controller.

8. The method of claim 7 wherein transmitting the at least one of the sensed characteristics of the mobile cleaning machine and the non-mobile cleaning machine data to the central location is performed wirelessly.

9. The method of claim 7 wherein the mobile cleaning machine is a floor scrubbing machine.

10. The method of claim 7 wherein the non-mobile cleaning machine data set includes employee information.

11. The method of claim 7 wherein transmitting the non-mobile cleaning machine data to the controller is performed at least in part wirelessly.

12. The method of claim 7 wherein the one or more sensed characteristics of the mobile cleaning machine include one or more of an x-direction, a y-direction, a mobile cleaning machine speed, a brush speed, a brush state, an acceleration, and a chemical deposition.

13. A system for communicating one or more characteristics of a mobile cleaning machine and a non-mobile cleaning machine data set to a central location, the system comprising:
   a mobile cleaning machine-mounted gateway device;
   a communication device configured to communicate non-mobile cleaning machine data to the gateway device; and
   a mobile cleaning machine including
      a chassis,
      a communications module configured to communicate with the communication device,
      a sensor operable to sense one or more characteristics of the mobile cleaning machine, and
      a processor and memory, the processor programmed to perform instructions stored in the memory, the instructions including
         receiving the one or more characteristics of the mobile cleaning machine sensed by the sensor,
         receiving the non-mobile cleaning machine data, and
         transmitting at least one of the one or more characteristics of the mobile cleaning machine and the non-mobile cleaning machine data set to a central location via the gateway device.

14. The system of claim 13 further comprising a wireless receiver by which the non-mobile cleaning machine data is received.

15. The system of claim 13 wherein the mobile cleaning machine is a floor scrubbing machine.

16. The system of claim 13 wherein the non-mobile cleaning machine data includes at least one of employee information, non-mobile cleaning machine task information, and non-mobile cleaning machine maintenance information.

17. The system of claim 13 wherein the non-mobile cleaning machine data and the one or more characteristics are output to a network via a wireless connection.

18. The system of claim 13 wherein the one or more characteristics of the mobile cleaning machine include one or more of an x-direction, a y-direction, a mobile cleaning machine speed, a brush speed, a brush state, an acceleration, and a chemical deposition.

19. The system of claim 13 wherein the communication device is a mobile reader.

20. The system of claim 13, wherein the communication device includes at least one of a bar code reader and a QR code reader, and an RFID reader.

* * * * *